United States Patent [19]

Albrecht

[11] Patent Number: 5,430,998
[45] Date of Patent: Jul. 11, 1995

[54] UNDERWATER WEED CUTTING MACHINE

[76] Inventor: Allan J. Albrecht, 1011 Harlyn Ave., Rothschild, Wis. 54474

[21] Appl. No.: 221,886

[22] Filed: Apr. 1, 1994

[51] Int. Cl.6 ...................... A01D 44/00; A01D 34/83
[52] U.S. Cl. ............................................. 56/8; 56/290
[58] Field of Search ................. 56/8, 9, 244, 245, 290, 56/291, 292

[56] References Cited

U.S. PATENT DOCUMENTS

| 1,200,096 | 10/1916 | Firman . | |
|---|---|---|---|
| 1,344,624 | 6/1920 | Ellis | 56/290 |
| 2,317,367 | 4/1943 | Foerter | 56/8 |
| 2,603,051 | 7/1952 | Williams | 56/8 |
| 4,164,835 | 8/1979 | Conte | 56/291 |
| 4,205,507 | 6/1980 | McClure | 56/8 |
| 4,328,658 | 5/1982 | Desrosiers et al. | 56/8 |
| 4,815,260 | 3/1989 | Desrosiers | 56/9 |
| 4,885,902 | 12/1989 | Schmidt | 56/8 |
| 4,942,722 | 7/1990 | Deerosiers | 56/8 |
| 5,189,867 | 3/1993 | Schmidt | 56/8 |

FOREIGN PATENT DOCUMENTS

2632309  1/1978  Germany .................................. 56/8

Primary Examiner—David J. Bagnell
Attorney, Agent, or Firm—Moore & Hansen

[57] ABSTRACT

An aquatic weed cutter has a continuous cable strung along the horizontal and vertical members of an inverted T-shaped cable frame. The cable is moved by a motor drive in a circuit between opposed sheaves on the ends of the horizontal and vertical members. The drive comprises a pair of engaging belts which hold the cable therebetween and drive it about the circuit. Cutting clips are attached at spaced intervals to the cable for cutting the stems of underwater plants.

23 Claims, 6 Drawing Sheets

UNDERWATER WEED CUTTING MACHINE

BACKGROUND OF THE INVENTION

This invention relates generally to aquatic weed cutting machines. More particularly, this invention pertains to boat-mounted machines for cutting aquatic plants growing in bodies of water.

The overgrowth of aquatic plants in freshwater lakes often results in the deprivation of subsurface sunshine, the depletion of dissolved oxygen, and contributes to the eutrophication of the water body, particularly in the die-off which occurs in the autumn of the year. Nutrients which have been deposited in the sediments over a long time period are re-introduced to the water body, resulting in over-fertilization.

Often, over-growth of aquatic weeds decreases the viability of the fish population, limiting the water surface area available for use by waterfowl and anglers, swimmers and waterskiers.

Eurasian watermilfoil is a particularly troublesome weed, having a high reproduction rate which enables it to completely take over a body of water in a few years. Other plants are rapidly displaced, and the water body loses much of its value as a resource for wildlife and recreational values, e.g. boating, fishing and swimming.

While the introduction of copper compounds into the water body has been used to limit plant growth, its general application is considered not acceptable for ecological reasons.

Various types of apparatus have been devised for cutting aquatic weeds. For example, U.S. Pat. No. 1,200,096 of Firman discloses a kelp harvester using cutter blades mounted on a pair of spinning horizontal circular disks.

U.S. Pat. No. 2,317,367 of Foerster describes a submarine weed cutter using a straight saw blade suspended between the ends of a cable, by which the blade is reciprocally moved.

A U.S. Pat. No. 4,205,507 of McClure discloses a weed cutter with a cutter bar comprising two elongate members. Each member has a plurality of teeth, and relative reciprocating movement of the members provides a cutting action therebetween.

In U.S. Pat. Nos. 4,328,658, 4,815,260 and 4,942,722, Desrosiers et al. show a weed harvester which is basically a multi-strand cable which is drawn through a weedy area and continuously twisted. The twisting action wraps weeds around the cable, and cable movement wrenches the weeds from the ground, drawing them to the drive mechanism. The apparatus is not a cutter.

In U.S. Pat. Nos. 4,885,902 and 5,189,867, Schmidt describes another aquatic vegetation cutter using a cutter bar with two reciprocating blade assemblies, each with multiple teeth.

These prior art cutters suffer from various disadvantages, including low cutting rates, clogging, substantial maintenance downtime, high construction cost, and the necessity for a dedicated weed cutting watercraft. In addition, none of the prior art cutters known to applicant are capable of following bottom terrain changes. An aquatic vegetation cutter is needed which is simple in construction, easy to operate and maintain, adaptable to various water and plant conditions, and effective to achieve a high harvest rate.

BRIEF SUMMARY OF THE INVENTION

The primary object of this invention is to provide a boat mountable aquatic weed cutter which cuts plant growth at a high production rate.

A further object of the invention is to provide an aquatic weed cutter which cuts underwater plant growth over an adjustable range of water depth.

Another object of the invention is to provide a basic type of cutting apparatus which may be adapted to cut plant growth at water depths exceeding 100 feet.

An additional object of the invention is to provide an aquatic weed cutter which cuts underwater plant growth while moving in either a forward or rearward direction.

Another object of the invention is to provide an aquatic weed cutter which cuts underwater plant growth without having its cutter or support structure becoming entangled or clogged with plant growth.

A further object of the invention is to provide an aquatic weed cutter which swings out of the way when underwater obstructions and changes in water depth are encountered, without discontinuing its cutting action.

Another object of the invention is to provide an aquatic weed cutter which is easily mounted on boats of varying design, size and construction.

An object of the invention is to provide an aquatic weed cutter which is quickly and easily dismounted from a boat, not requiring that the boat be dedicated solely to a weed cutting purpose.

An additional object of the invention is to provide an aquatic weed cutter whereby operation of the boat and the cutter may be accomplished by a single person.

Another object of the invention is to provide an aquatic weed cutter which may be constructed of readily available inexpensive materials.

Another object of the invention is to provide an aquatic weed cutter which uses the natural water-caused resistance to movement to enhance the cutting action.

Furthermore, an object of the invention is to provide an aquatic weed cutter which results in irregular, multiple extended fractures of the weed stems to discourage re-growth.

In addition, an object of the invention is to provide an aquatic weed cutter which is particularly useful for cutting Eurasion watermilfoil, a very troublesome non-native nuisance weed which has become the dominant plant in many lakes.

The invention comprises an aquatic plant cutter using an endless cable to which protruding plant fracturing devices such as projections or clips are fixed. In use, the cutting cable is unidirectionally driven by a motor and traverses opposite sides of the horizontal swath member and vertical mast of a partially submersible inverted T shaped cutter frame. The cable passes over a series of sheaves mounted at the ends of the vertical and horizontal members of the inverted T structure. The cable generally follows the front and rear sides the horizontal swath member and opposite sides of the vertical mast, preventing the entanglement of plant growth which may otherwise occur. When operating, the entire underwater structure has an adjacent moving cutting cable. The cutting devices attached to the cable are mounted to cut at various angles about the circumference, or entirely around the circumference of the cable, so that axial twisting of the cable does not effect cutting ability.

In this invention, the aquatic weeds are held by water resistance against the moving cable and fractured by the projections or clips attached to the cable. High speed impact of the clips with the plant stein roughly fractures the stem. Although the terms "cutting" and "cutter" are used herein, they refer to a preponderance of rough fracture by impact rather than clean cuts typical of other devices having extended sharp cutting edges.

The generally vertical mast is variably mounted in a mounting collar so that the mast and attached swath bar may be easily raised and lowered between a lowermost operating position and an uppermost position above the water level. The mast position may be controlled manually or e.g. with an electric winch.

In one embodiment, the cutting cable is compressed between and driven by the abutting moving belts of a stationary double-belt drive. In another embodiment, the cutting cable is mounted on and driven by a rotating friction-drive pulley or drum. The drive apparatus may be powered by a small internal combustion engine.

The entire plant cutter is light in weight and may be fabricated in a size which is easily mounted on a small boat for use by the owner of lakefront property, for example. However, it may be configured to be attached to the front, rear, or side of any boat, including a pontoon boat, barge or a raft which may be towed through the water. Of course, the device may be made of a larger size for use with larger craft. Furthermore, the mast may be made in any practical length, for plant cutting in relatively shallow inland lakes, for example, or for cutting at greater depths such as 100 feet or more.

The plant cutter is mounted to a craft so that the mast is generally upright or vertical in the plant cutting mode. The weed cutter, including mast, swath member, engine and drive are together mounted to the craft with a hinge so that the swath member and mast may swivel upwardly should an underwater obstacle or shallower water be encountered. The cutter is configured to continue cutting regardless of upward swivelling of the swath bar and mast, providing a bottom terrain following ability. The cutter may be swung to a generally horizontal configuration for transportation and storage.

BRIEF DESCRIPTION OF THE DRAWINGS

The named objects and other objects and advantages of the aquatic weed cutter of the invention will be readily understood by reading the following description in conjunction with the accompanying figures of the drawings wherein like reference numerals have been applied to designate like elements throughout the several views.

DESCRIPTION OF THE PREFERRED EMBODIMENTS

Figure 1:
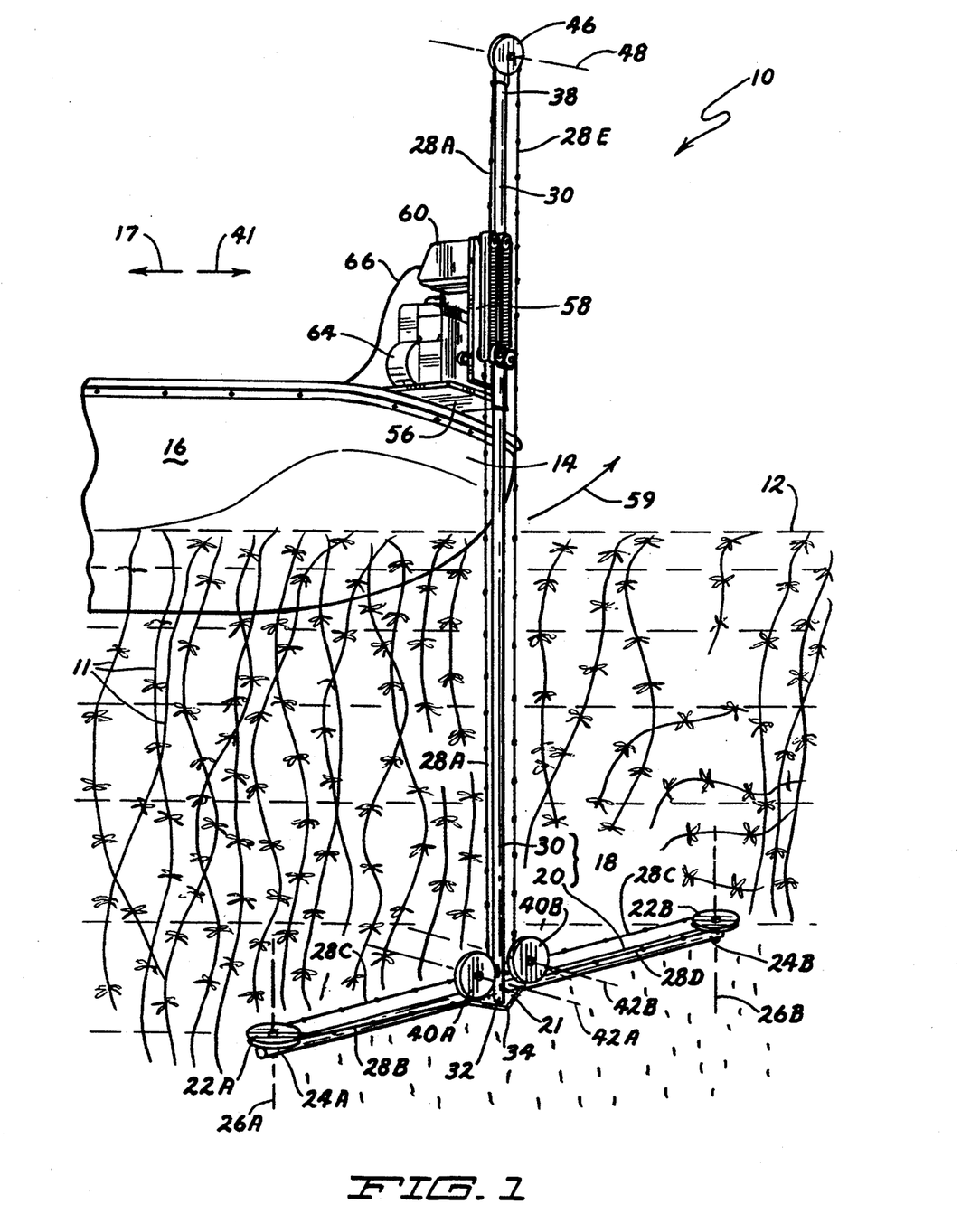
FIG. 1 is a perspective view of the weed cutter of the invention as mounted on a small boat for cutting aquatic plants.

With reference to the drawings, and particularly to FIG. 1, an underwater weed cutter 10 is depicted in a normal operating configuration for cutting aquatic plant growth 11 below the upper water surface 12. The weed cutter 10 may be attached to a boat, pier or other structure adjacent the high-growth water area, and is shown in one possible operative position, i.e. mounted on the front end 14 of a motor powered boat 16 to achieve a high cutting rate. As shown, the boat 16 would be typically operated in the reverse direction 17 to draw the cutter frame 18 through the water.

As shown in FIGS. 1-5, and particularly in FIG. 1, the weed cutting apparatus 10 includes a cutter frame 18 which is designed to be partially submerged when cutting plant growth. The cutter frame 18 includes an upright mast 30 and a generally horizontal swath bar 20 with outer sheaves 22A, 22B mounted on opposing ends 24A, 24B. The cutter frame is most advantageously formed of metal tubing such as e.g. aluminum. Square or round aluminum tubing in commercially available forms has sufficient strength for this application, resists corrosion, and is relatively inexpensive.

As shown, the outer sheaves 22A, 22B are mounted to rotate about generally vertical axes 26A, 26B and are of a size such that a cable 28 strong about the sheaves will be spaced from the swath bar 20 rearwardly and forwardly therefrom. The minimum spacing 29 (see FIG. 4) prevents cutting projections or clips 50 on the cable 28 from deleterious contact with the swath bar 20.

As shown, the upright mast 30 has its lower end 32 fixedly attached to the longitudinal centerpoint 34 of the swath bar 20 by welding or mechanical fasteners such as bolts. In the embodiment depicted, the mast 30 is welded to a flat metal member 21 which is welded to the center portion of the swath bar 20. The mast 30 extends upwardly through a mounting collar 36 (FIG. 2) to an upper end 38. The mast 30 and swath bar 20 are so attached that drag forces exerted on either side of the mast 30 by the swath bar 20 are substantially balanced, reducing the net shear force about the axis of the mast.

A pair of inner cable sheaves 40A, 40B is rotatably mounted on the lower end 32 of the upright mast 30 or to the swath bar 20. As shown, inner sheaves 40A, 40B are mounted on a connector plate or bar(s) 44 welded to the lower end 32 of mast 30. Inner sheaves 40A, 40B have substantially parallel horizontal axes of rotation 42A, 42B, respectively, which are oriented along the general direction of movement of the apparatus through the water. The inner sheaves 40A, 40B change the direction of axial movement of the cable 28 between a horizontal direction adjacent the swath bar 20 and a vertical alignment which is parallel to but spaced from the mast 30. As shown, the cable 28 is directed by the inner sheaves 40A, 40B in paths on the left and right sides of the mast 30 to provide two cutting paths whether the cutting apparatus 10 is operated in the forward direction 17 or rearward direction 41 (FIG. 1). Inasmuch as most aquatic plants have generally vertical stems, the majority of the cutting action is performed by the cable 28 where its horizontal orientation intersects the plant stems, i.e. along the swath bar 20. Less stem cutting generally occurs along the vertical runs of the cable 28, i.e. along the upright mast 30.

Figure 2:
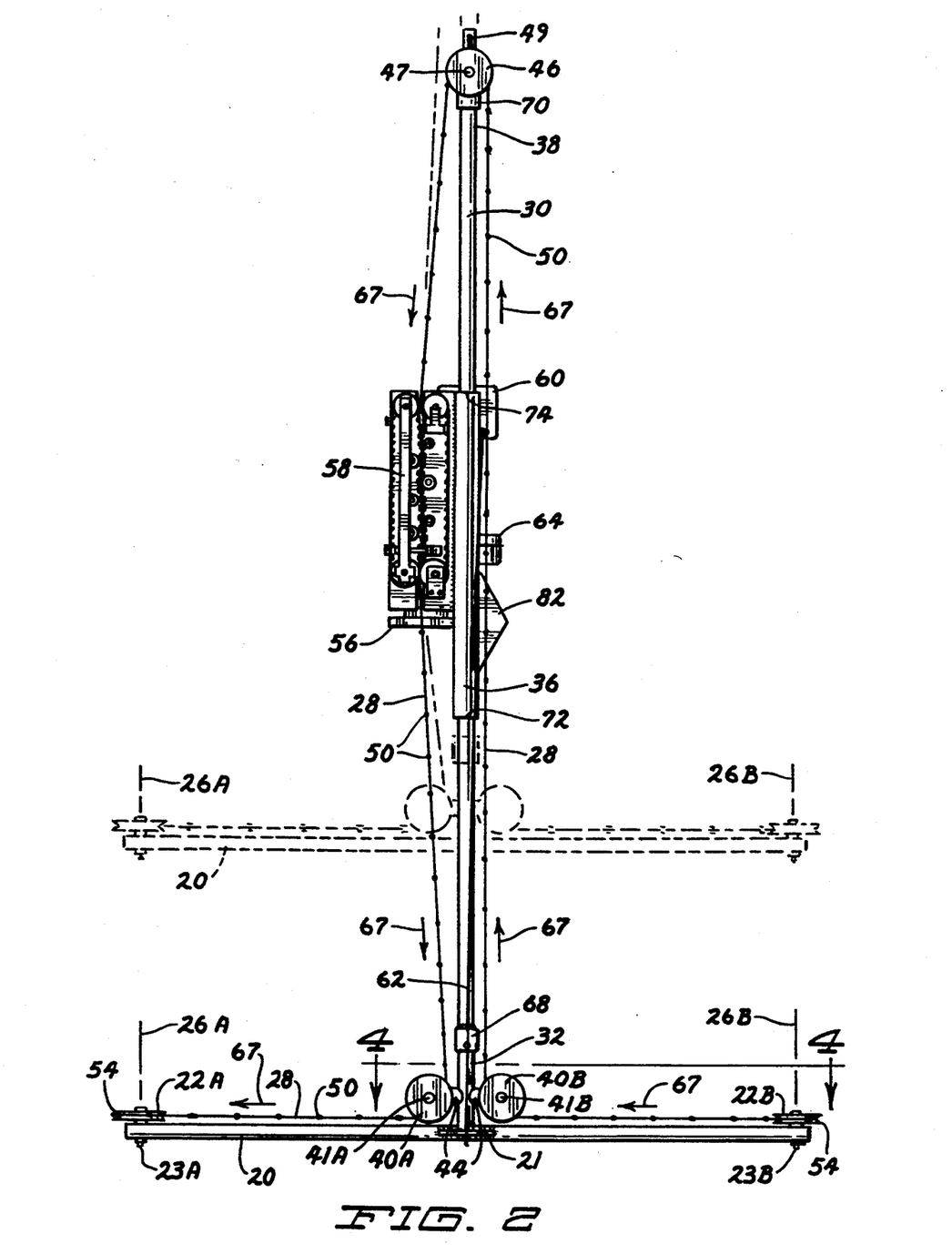
FIG. 2 is an end view of the weed cutter of the invention.

An upper sheave 46 is mounted on the upper end 38 of the upright mast 30 and has a horizontal axis 48 such that the cable 28 passes upwardly, spaced from one side of the mast 30, and downwardly on the opposite side of the mast. As shown in FIG. 2, tipper sheave 46 is adjustable on the mast 30 by adjusting the position of its axle 47 in axle receiver 49.

It is understood that each of the sheaves freely rotates about a central axle which may be simply a bolt and nut, as is well known in the art. More sophisticated bearinged axles may be used if desired. As shown in the drawings, outer sheaves 22A and 22B rotate about axles 23A and 23B, respectively. Inner sheaves 40A and 40B rotate about axles 41A and 41B, respectively. Upper sheave 46 rotates about axle 47.

Each of submersible sheaves 22A, 22B, 40A and 40B has sideplate circumferential edges 54 which may be sharpened to assist in the underwater cutting of plant growth. This is particularly illustrated in FIGS. 2-4.

A continuous cutting cable 28 with attached cutting projections or clips 50 is strung on the sheaves 22A, 22B, 40A, 40B and 46 as shown in FIGS. 1 and 2. The tautness of the cable 28 is adjustable by varying the position of a sheave to shorten or lengthen the cable path, as already described. Generally, only one sheave needs to be adjustable to accommodate variations in cable length and for enabling mounting and removal of the cable 28 from the cutter frame 18.

As shown in FIG. I for the purpose of clarity, the entire path of the cable 28 may be subdivided into the various sectors between the sheaves. Thus, cable 28 is shown as comprised of sectors 28A, 28B, 28C, 28D and 28E, each of which extends from one sheave to another sheave as the cable moves therebetween. Sector 28B, which spans the swath bar 20 between sheaves 22A and 22B, is typically used as the primary cutting sector, and faces the underwater growth to be cut. However, operation of the illustrated boat 16 in either the forward direction 41 or rearward direction 17 results in satisfactory high-speed cutting.

Figure 3:
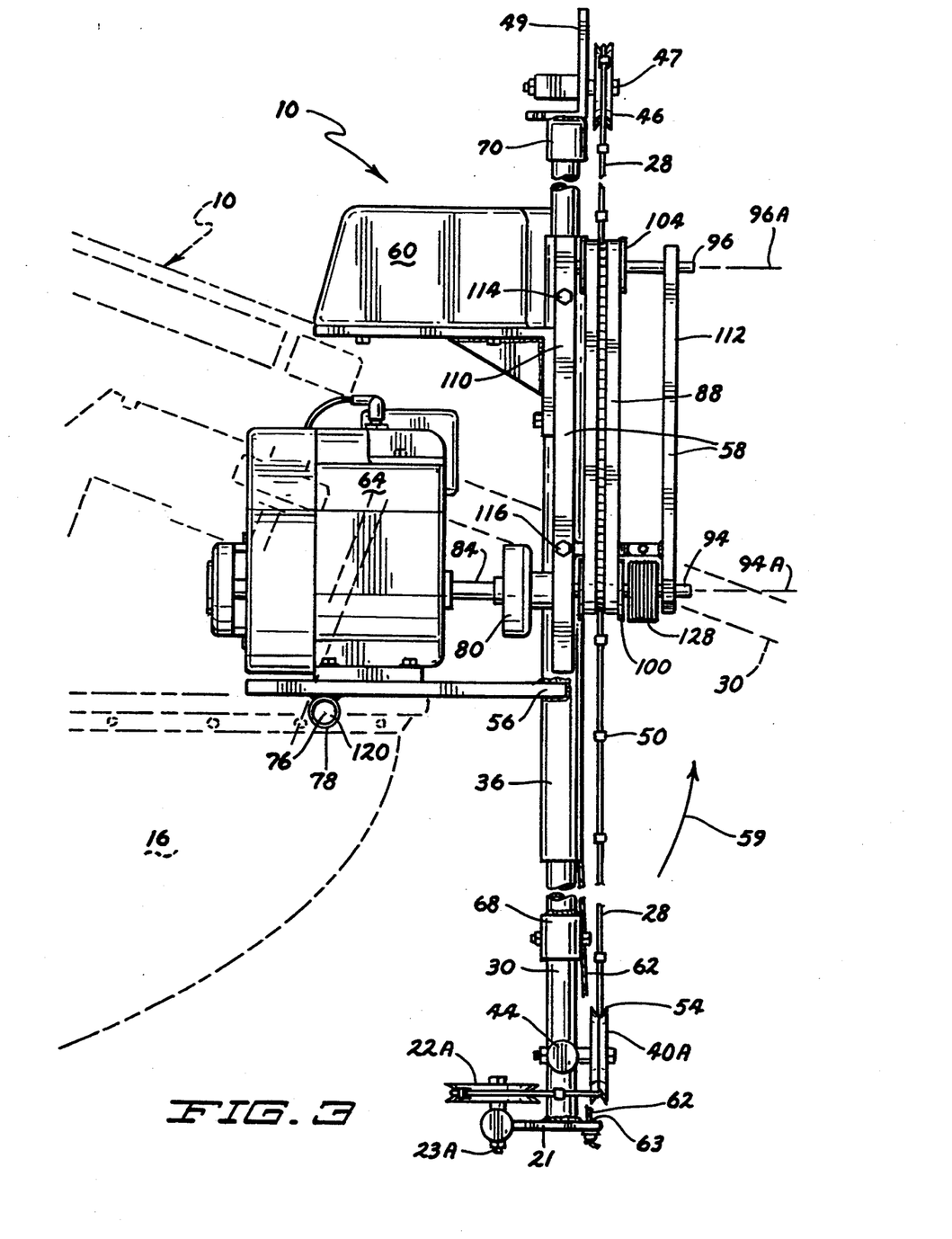
FIG. 3 is a side view of the weed cutter of the invention.
Figure 4:
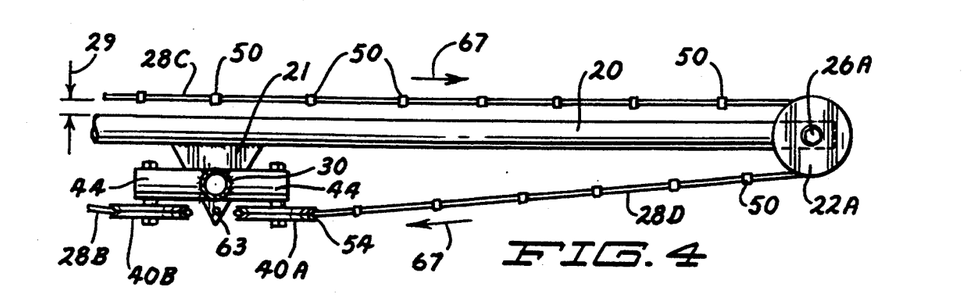
FIG. 4 is a sectional plan view of the swath bar of the weed cutter of the invention as taken along line 4—4 of FIG. 2.

The mounting collar 36 (see FIG. 2), together with a cable drive 58 and motor 64, is supported by a base plate or frame 56 by which the cutter 10 is hingedly attached to a boat 16 or other structure. The mast 30 slidingly passes through the mounting collar 36 while the cable 28E is shown as passing upwardly, spaced from the collar. Cable 28A passes downward and is shown as being driven downward by the cable drive 58 exterior the collar 36. If desired, the mounting collar 36 may be formed of a square tube which prevents twisting of the mating square tubing of the inserted mast 30. The mast 30 may be raised from a lowermost submerged cutting position to an above-water position shown in phantom in FIG. 2 and positioned at any location therebetween. In accordance with one aspect of the invention, an electric anchor winch 60 is adapted to raise and lower the mast 30 through a winch cable 62 attached to the swath bar 20 or the lower portion 32 of the mast. In FIGS. 2-4, the winch cable 62 is shown passing through a hole 63 in the flat member 21 and knotted to keep it in place. The winch 60 may be remotely controlled through wires 66 for easy manipulation of the mast position from the opposite end of the boat. The electric winch 60 also acts to maintain the desired position without the necessity for another locking mechanism.

Alternatively, a setscrew or other device may be used to maintain the mast 30 at the desired position in the mounting collar 36.

While the figures illustrate the cable 28 as travelling in direction 67 in its circuit about the cutter frame 18, the cable movement may be in either direction.

The mast 30 is shown in FIG. 2 with a lower stop 68 which may engage the lower end 72 of collar 36 to limit upward movement of the mast. Likewise, upper stop 70 engages the upper end 74 of the collar 36 to limit downward movement of the mast 30.

Because of the hinged mounting of the cutting apparatus 10, the swath bar 20 and mast 30 may readily swing upwardly along line 59 about hinge axis 76 when an underwater obstacle or shallow water is encountered. The swath bar 20 will tend to follow an undulating bottom and continue to effectively cut plant growth even when the mast 30 is not vertically oriented. The weight distribution of the apparatus relative to the hinge axis 76 (FIG. 3) is such that during normal cutting operations, the mast 30 remains generally upright, even when the apparatus is moved relatively rapidly through the water. The encounter of the swath bar 20 with underwater obstructions or suddenly shallow water does not upset the stability of the water craft or require any emergency measures to be undertaken. The swath bar 20 will pass over the shallower bottom terrain without an interruption in cutting, because the hinged mounting provides a terrain following ability. The force of gravity on the cutter 10 returns the swath bar 20 to its lowest unimpeded position along its arc of swinging movement.

At all times while operating, the entire underwater portion of swath bar 20 and mast 30 continues to cut plants, preventing the possibility of entanglement with the apparatus.

When the mast 30 is raised to an upper level and swung upwardly about axis 76 along line 59 to a generally horizontal position for transport or storage, the weight distribution about hinge 78 is such that the horizontal position will be maintained. The cutting apparatus 10 is shown in phantom in FIG. 3 in a nearly horizontal position. It should be noted that the swath bar 20 may be raised out of the water simply be operating the winch 60 to raise the mast 30. Likewise, swinging the mast 30 upward about hinge axis 76 to a horizontal position will remove it from the water.

As shown in FIG. 3, hinge 78 may be a tubular member which is rotatable about a smaller tubular or solid shaft 120. The shaft 120 may be attached to the sides of a watercraft 16, for example by any practical means known in the art. For example, the shaft 120 may be a spindle mounted in brackets on opposite sides of a small boat near the front or rear end of the boat.

Figure 5:
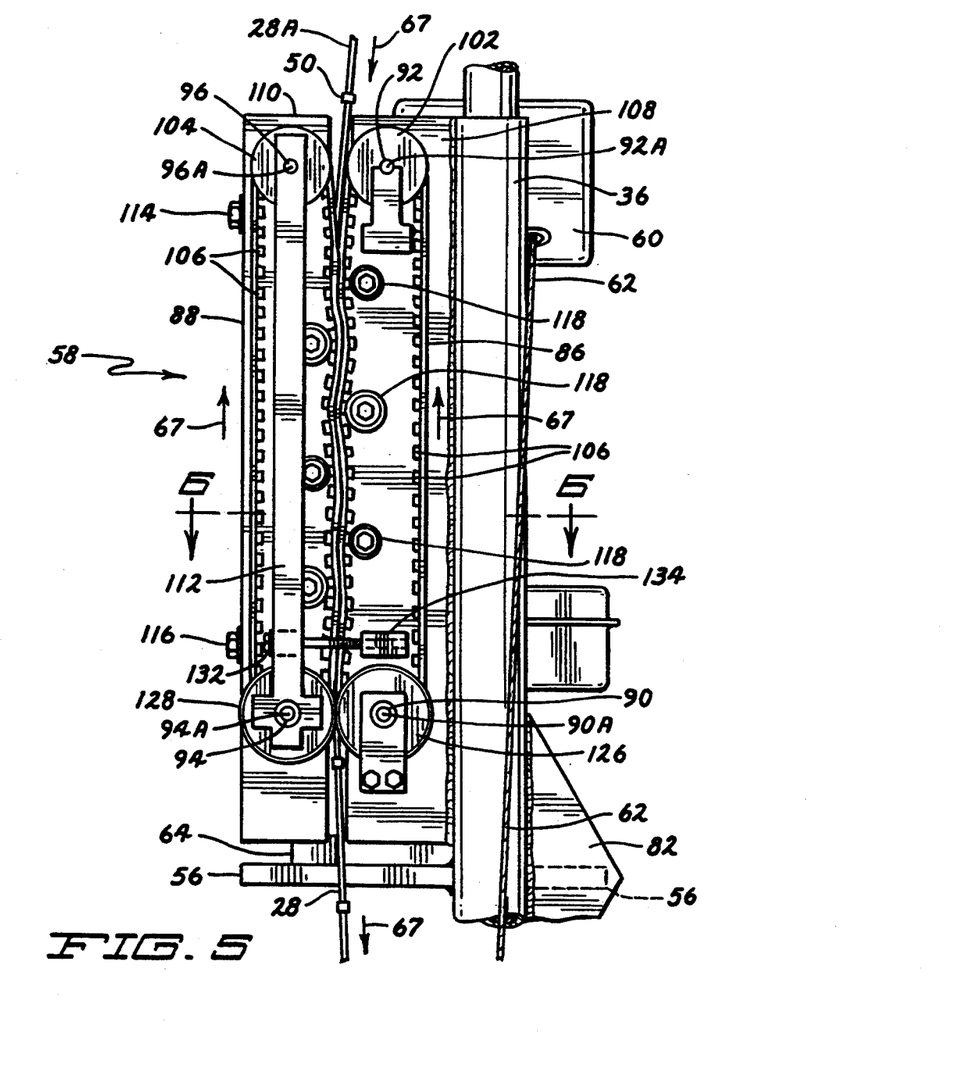
FIG. 5 is an end view of a cable drive mechanism of the weed cutter of the invention.

Turning now to FIGS. 3-5, the cable drive 58 is shown attached to the mounting collar 36. The mounting collar 36 is attached to the base plate 56 through reinforcement member 82 (FIGS. 2 and 5). A motor 64, typically a small internal combustion engine, is mounted on the base plate 56. The engine's drive shaft 84 is connected through a centrifugal clutch 80 to a first shaft 90 of a cable drive 58 to move the cable 28 when the engine speed exceeds a preset value. Such clutches are well known, being commonly used with a variety of engine powered machinery.

Figure 6:
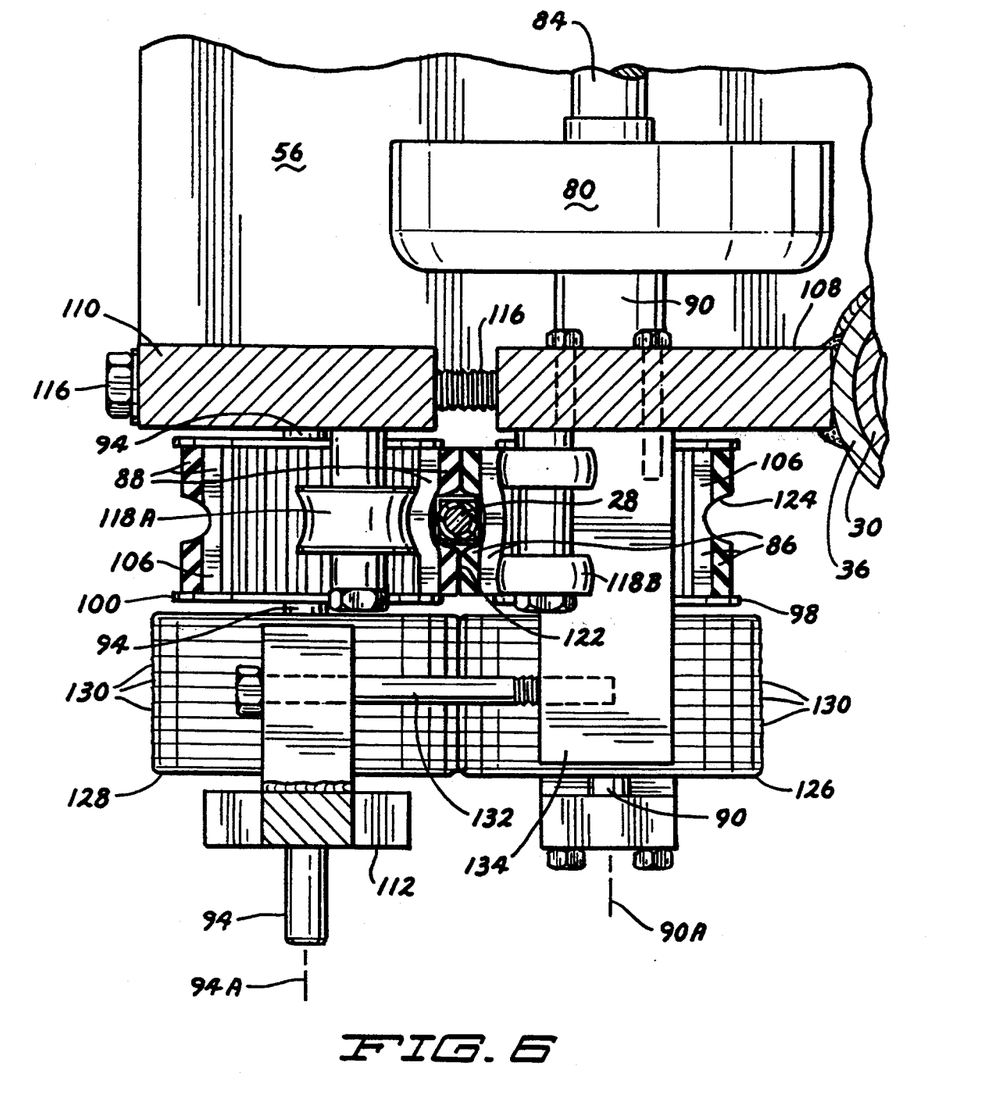
FIG. 6 is an enlarged cross-sectional plan view of the cable drive mechanism of the invention, as taken along line 6—6 of FIG. 5.

The particular type of cable drive 58 illustrated herein comprises a pair of flexible elastomeric belts 86, 88, each mounted on a pair of spaced pulleys for rotation thereon. As shown, each of the belts 86, 88 may be a conventional timing belt having an inner surface with gear teeth 106 to enable high speed movement about small diameter geared pulleys without slippage. In FIGS. 5 and 6, drive belt 86 is shown mounted on geared lower pulley 98 (FIG. 6) and geared upper pulley 100 (visible in both figures). Pulleys 98 and 99 rotate about shaft 90 (having axis 90A) and shaft 92 (with axis 92A), respectively. Secondary belt 88 is mounted on geared lower pulley 100 (FIG. 6) and geared upper pulley 102 (visible in both figures), which in turn rotate about shafts 92 and 93, respectively. Each of the shafts 90 and 91 is rotatably mounted in bearings, not shown, in first frame member 108, the latter being rigidly attached to the mounting collar 36. Each of shafts 92 and 93 is similarly mounted in second frame member 110, which is adjustably positioned so that the two belts 86, 88 engage each other and compressingly enclose the cable 28 therebetween for moving it. The second frame member 110 may be adjusted to the desired engaging position with the first frame member 108 by upper adjustment screw 114, lower adjustment screw 116 and drive wheel adjustment screw 132.

In an alternative arrangement, of course, shafts 92, 94 and 96 may be fixedly attached to the respective frame members 108, 110 and 112, and the pulleys rotated about the respective shafts.

As shown, a plurality of interacting bogey rollers 118 are rotatably mounted to each of the first and second frame members 108, 110 to guide the engaging belts 86, 88 and maintain the compression between the belts and cable 28 as the belts move in concert from pulley to pulley. As depicted in FIG. 6, the rollers 118 may take the form of single bogey rollers 118A, split bogey rollers 118B, or other form. The single bogey rollers 118A may have a concave roller surface and compress the center portion of the belts. The split bogey rollers 118B substantially span the belt width and compress the outer portions of the belts to produce a concave belt configuration about the cable 28. The rollers 118 attached to the first frame member 108 may be alternated in vertical location relative to the rollers attached to the second frame member 110 (see FIG. 5), and either type of roller may be attached to each of the frame members 108, 110. Preferably, the types of rollers 118 are alternated on each side so that the edges of each belt 86, 88 are forced concavedly around the cable 28 in several locations. Thus, the cable 28 is firmly held between the belts 86, 88 and will not become dislodged.

As depicted in FIG. 5, the alternating rollers 118 may be positioned so that during operations, the rollers alternatingly push the belts from side to side. Thus, the interface 122 between the belt edges is not a simple plane, but comprises a slight zig-zag surface with rollers 118 mounted on the first frame member 108 forcing the belts toward the second frame member 110, and vice versa. This further enhances the engagement between the belts 86 and 88 and between the belts and the cable 28 so that the moving belts securely drive the cable without slippage.

As shown in FIG. 6, the central portion of the belts 86, 88 may be formed with a groove 124 to assist in maintaining the cable 28 in the proper driving location.

While the engagement of belt 88 with drive belt 86 along interface 122 may ensure that the cable 28 is driven without slippage, an additional feature particularly shown in FIGS. 3, 5 and 6 transfers additional drive power to the cable. First drive wheel 126 is coaxially with, and shown attached through shaft 90 to the first geared pulley 98. A second drive wheel 128 is coaxially attached through shaft 94 to the second geared pulley 100, to drive it. The wheels 126, 128 may be gears, friction wheels, or other cooperating devices to rotate wheel 128 from motor-driven wheel 126. The wheels 126, 128 turn in opposite rotative directions. Thus, both belts 86, 88 are driven by the motor 64. In FIGS. 5 and 6, the drive wheels 126, 128 are shown as cylindrical wheels with interengaging radial grooves 130. They may be formed of neoprene and the like materials which have good wear characteristics and sufficient coefficient of friction. Compression between wheels 126 and 128 may be adjusted by setting of screw 132 which joins third frame member 112 to leg 134, the latter rigidly attached to the first frame member 108.

While a double-belt cable drive 58 is described herein as the apparatus driving the cable 28, the cable drive unit may alternatively be a rotating wheel, not shown, about which the cable rides and is frictionally driven.

Figure 7:
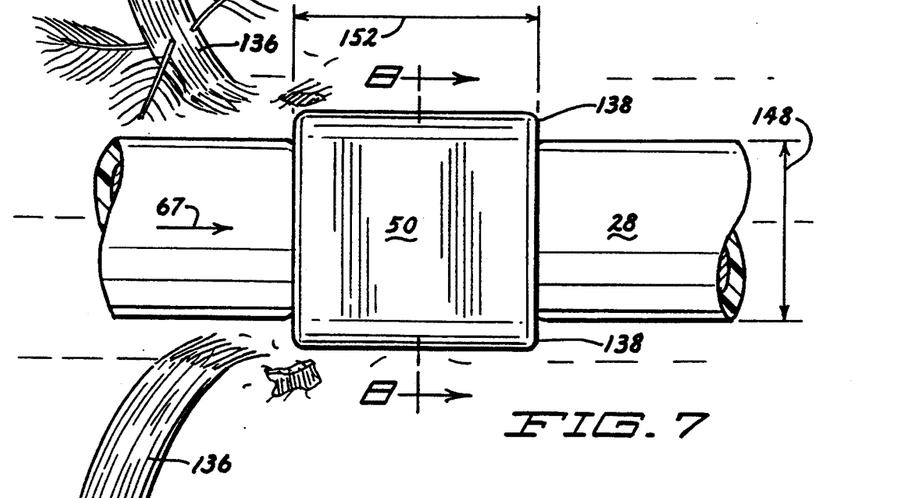
FIG. 7 is an enlarged side view of a cutting cable and attached cutting clip of the invention.

FIG. 7 shows a cutting cable 28 with an attached cutter clip or projection 50 which, travelling in direction 67, has cut a plant Stem 136. The edges 138 of the clip 50 may be sharpened, or be merely rounded as shown, with generally little difference in cutting ability. The cutting or fracturing results from the high speed impact of the clip edges 138 with the stem 136.

The axial length 152 of the clip 50 may vary as long as it is not so long as to interfere with cable movement about the sheaves, or is so short that there is insufficient gripping force upon the cable sheath. For most purposes, clip lengths 152 of about 1–2 times the overall cable diameter 148 have been found satisfactory.

Figure 8:
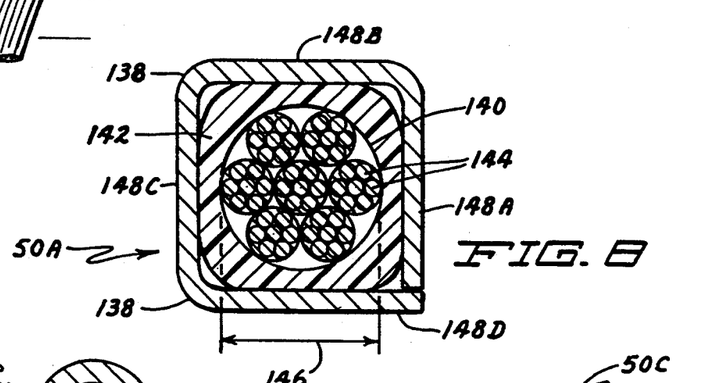
FIG. 8 is a cross-sectional view of a cutting cable and cutting clip, as taken along line 8—8 of FIG. 7.

As shown in FIG. 8, the cutting cable 28 may be an endless multifilament wound wire core 140 with a flexible sheath 142. The sheath is typically formed of a smooth polymeric material with a generally low coefficient of friction. The cable 28 is generally pliant for ease of movement about the sheaves. A commercially available cutting cable 28 suitable for this purpose comprises a core having seven multifilament wires 144 and having a core diameter 146 of about 0.15 inch. The core 140 is covered with a sheath 142 of tough polymeric material such as polyurethane, nylon or the like to provide an overall diameter 148 of about 0.25 inch. The cable 28 may be of a lesser or greater overall diameter, depending upon the tensile strength of the cable and total cable length. For example, a cable 28 with an overall nominal diameter of about 0.125 inch may be useful.

Cutting projections or clips 50 are mounted on the cable 28 at spacings 52 of typically about 4–12 inches. A spacing 52 closer than about 4 inches does not significantly enhance the cutting action, and a spacing 52 greater than about 18 inches may require significantly greater input horsepower to drive the cable at the higher cutting speed necessary to achieve the same overall harvest rate. The cutting projections 50 typically increase the effective overall diameter of the cable by about 1–4 mm.

The cutting cable 28 is designed to be drawn in a circuit about the cutter frame 18 at a lineal speed of between about 300 and about 2500 feet per minute. The optimal cable speed for a specific application is dependent upon the clip spacing, plant type and density, etc.

The overall rate of cutting is dependent upon plant bed density, cable speed, clip spacing and the rate of movement through the weed bed, i.e. a higher cable speed enables a higher speed of swath bar 20 movement through the weed bed. As an example, a small boat-mounted weed cutter 10 having an eight foot long swath bar 20 and travelling through the weed bed at a speed of 120 feet per minute will clear about 1.3 acres (0.5 hectares) per hour.

A cutting apparatus 10 may include a gear drive reduction unit or belt drive speed reduction unit (neither of which is shown) if necessary to achieve the desired speed of cable 28. Such speed reducing mechanisms are well known in the mechanical art.

Figure 9:
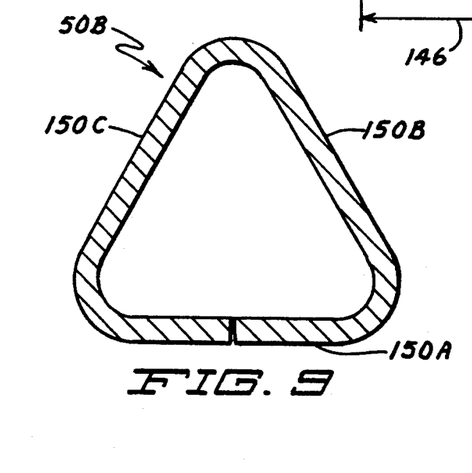
FIG. 9 is a cross-sectional view of an alternative cutting clip of the invention.

The clips 50 shown in FIGS. 7-9 comprise hard, corrosion resistant metal strips which are bent into a plurality of sides. FIG. 8 shows clip 50A formed with four sides 148A, 148B, 148C and 148D. FIG. 9 shows clip 50B formed with three sides 150A, 150B, and 150C. Each corner edge 138 may be sharpened to form a cutting edge and the clip 50 is compressed, clamped or crimped on all sides onto the cable 28. However, it has been found that an unsharpened, or even a rounded edge cuts plant stems well, and leads to less wear of the drive belts 86, 88 and sheaves 22, 24, 26. The severing of the stems results from relatively high speed repeated impact of the clips 50, and sharp clip edges are not strictly required.

Figure 10:
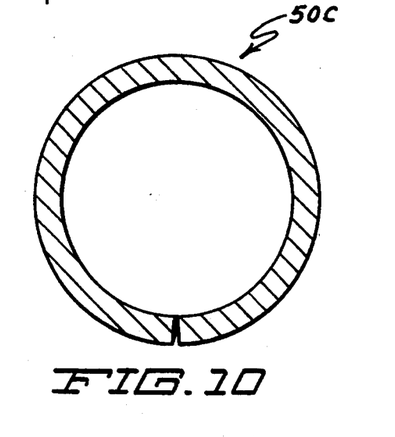
FIG. 10 is a cross-sectional view of a still further alternative cutting clip of the invention.

The clip may take other forms. For example, a circular ring-shaped cutting clip 50C may be used, as depicted in FIG. 10.

Any hard clip which provides a radius change on the order of about 0.5-2 mm is sufficient to achieve the desired cutting.

The clips 50 are tightly held by the somewhat elastic sheath 142 and provide a series of cable circumferential enlargements. As the cable 28 intercepts a plant stem 136, the stem bends about the cable 28 because of water resistance and slides on the polymeric cable sheath 142 until it is impacted by a clip 50. The repeated impact of fast moving clips 50 with the stem fractures and cuts the stem 136 which then typically rises to the water surface. The cuttings are typically harvested from the water surface for disposal or further use.

It has been found that plant stems or leaves intercepted by the cable 28 may be oriented in a direction varying from horizontal to vertical. The presence of a circumferential enlargement around 360 degrees of the cable 28 enables fracture/cutting of a stem or leaf to occur regardless of its orientation. Fracture normally occurs where the stem or leaf is drawn tangent with the cable. Cutting of the stems and leaves does not require uniform perpendicularity in their attitude but depends upon contact with a moving cutting clip 50. The cutting action is ensured by the natural resistance of the water against movement of the plants and the resistance of the lake bed in which the plants are rooted.

The swath bar 20 and upright mast 30 may be formed of commercially available tubing, preferably of a lightweight metal such as aluminum. The latter is advantageous from the standpoints of cost, ease of fabrication, weight and corrosion resistance. As noted above, square tubing may be particularly useful in this construction. Use of square tubing prevents the swath bar 20 frown rotating about the mast 30 due to differential applied resistance between the right and left sides of the swath bar 20.

The upright mast 30 may vary in length depending upon the particular use. In freshwater lakes, most plant growth typically occurs at water depths of less than about 12-16 feet. However, a cutting system of the invention is contemplated having a long mast for use at depths of 100 feet or more.

The fracturing/cutting action of the cable 28 does not depend upon a reciprocating movement, but occurs as the cable is moved unidirectionally in a continuous circuit about the cutter frame 18. However, a reversing gear box or other means known in the art for occasionally changing the direction of movement may be incorporated into the plant cutter 10. Such would increase the life of the cutting clips 50, enabling the user to distribute wear to opposing edges of each clip without removing and reversing the cable 28.

In use, a shroud may be placed about the upper portion of the mast 30, i.e. above the cable drive 58, to protect an operator from contact with the moving cable 28 and drive mechanism. The shroud, not shown, also channels water spray from the cable 28 back to the lake, to keep the operator dry.

It is anticipated that various changes and modifications may be made in the construction, arrangement, operation and method of construction of the aquatic plant cutter disclosed herein without departing from the spirit and scope of the invention as defined in the following claims.

What is claimed is:

1. An apparatus for cutting underwater plant growth, comprising:
    an elongate swath bar;
    an upright mast connected generally perpendicular to said swath bar, said mast movable longitudinally relative a mounting collar, said mounting collar hingedly adapted for mounting on a boat;
    a plurality of cable sheaves mounted on said swath bar and said mast in spaced-apart configuration;
    a cutting member comprising an endless multi-strand cable mounted in a circuit on said cable sheaves to be movable thereon, said cutting member including a plurality of spaced protrusions fixed to the cable;
    means for unidirectionally moving said cable in said circuit about said swath bar and mast; and
    means for submersibly suspending and moving said swath bar and cable mounted thereon in a water body to cut plant growth held against the cutting member by movement of the swath bar against water resistance.

2. An apparatus for cutting underwater plant growth, comprising:
    a cutter frame, comprising:
    an elongate swath bar configured for generally horizontal submersion in a water body, said swath bar having first and second ends, first and second outer cable sheaves mounted on said first and second ends, respectively, to rotate about parallel axes perpendicular to said swath bar;
    an elongate upright mast having a submersible lower end fixedly attached to said swath bar and extending upwardly therefrom to an upper end, first and second inner cable sheaves mounted on said lower end of the mast in a common vertical plane parallel to said swath bar, an upper cable sheave mounted on said upper end to rotate about a generally horizontal axis;
    a continuous cutting cable having a plurality of spaced cutting projections, said cable tensely stringable about said outer, lower and upper cable sheaves to move in a continuous circuit about said cutter frame for cutting proximate all submerged portions of said cutter frame;

connecting means for variably mounting said cutter frame to an above-water platform for vertical movement of said cutter frame;

drive means for controllable engagement with and movement of said cutting cable in said continuous circuit;

motor means connected to said drive means for motivation thereof; and hinged mounting means for mounting said cutter frame, cable, connecting means, drive means and motor means permitting swingable upward movement of said cutter frame from a generally vertical position to a generally horizontal position for following bottom terrain without stoppage of cable movement.

3. The apparatus of claim 2, wherein said above-water platform comprises a movable watercraft.

4. The apparatus of claim 2, wherein said cutting cable is configured to move unidirectionally in said circuit.

5. The apparatus of claim 2, wherein said drive means is configured to drive said cable at a linear velocity of about 300 to about 2500 feet per minute.

6. The apparatus of claim 2, wherein said swath bar has a front surface and a rear surface wherein said outer and inner sheaves are mounted to position the moving cutting cable forwardly of said front surface and rearwardly of said rear surface for cutting plant growth as the swath bar is directed in a forward or reverse direction.

7. The apparatus of claim 2, wherein said outer sheaves are mounted to rotate about generally vertical axes.

8. The apparatus of claim 2, wherein said cutting cable comprises an endless multifilament cable overcovered with a polymeric sheath, and having a plurality of hard projections comprising metallic cutting clips spacedly attached thereto.

9. The apparatus of claim 2, wherein said cable projection comprises a metallic clip providing an enlargement of the overall cable diameter of about 1-4 mm.

10. The apparatus of claim 2, wherein said cutting clip has cutting edges on all sides of said cutting cable.

11. The apparatus of claim 2, wherein said outer and inner sheaves have sharpened edges.

12. The apparatus of claim 2, further comprising a speed controlled clutch between said motor means and said drive means to initiate cable movement by controllably accelerating the motor means to a preset elevated speed to engage said clutch.

13. The apparatus of claim 2, further comprising an electric winch connected to said connecting means and having an extensible and retractable cable connected to the cutter frame for raising and lowering said cutter frame.

14. The apparatus of claim 2, wherein said drive means comprises:

a first elongate frame member;

first and second parallel spaced shafts, said first and second shafts rotatably mounted on said first frame member, each said shaft having a pulley mounted thereon for rotation;

a first continuous belt mounted on said pulleys on said first frame member;

a first set of rollers mounted on the first elongate frame member to engage and force a surface of said first belt outwardly;

a second elongate frame member:

third and fourth parallel spaced shafts, said third and fourth shafts rotatably mounted on said second frame member, each said third and fourth shaft having a pulley mounted thereon for rotation;

a second continuous belt mounted on said pulleys on said second frame member; and a second set of rollers mounted on the second elongate frame member to engage and force a surface of said second belt outwardly;

wherein said first frame member and said second frame member are positioned to position said outwardly forced surfaces of said first and second belts in engaging abutment for compressingly retaining and driving a movable belt therebetween.

15. The apparatus of claim 14, wherein one of said first, second, third and fourth shafts is connected to said motor means to be driven thereby.

16. The apparatus of claim 14, wherein said first and second sets of rollers are mounted to alternatively force said belts in a zig-zag movement.

17. The apparatus of claim 14, wherein said first and second belts have inner toothed surfaces for engagement with geared rollers, and one of said rollers has gears for engaging said toothed surfaces and is mounted on a shaft driven by said motor means.

18. The apparatus of claim 14, wherein said first and second belts are timer belts with inner toothed surfaces.

19. The apparatus of claim 14, further comprising a motor drive shaft connected to a centrifugal clutch, said clutch connected to one of said first, second, third and fourth shafts for driving said belts.

20. The apparatus of claim 14, further comprising means for driving one of said first and second belts by the other belt.

21. The apparatus of claim 20, wherein said driving means comprises a first wheel mounted on one of said shafts mounted on said first frame member and a second wheel mounted on a corresponding shaft mounted on said second frame member, whereby first and second wheels are engagable for transferring motion from said first shaft to said corresponding shaft.

22. A cutting cable for cutting underwater aquatic plants, comprising an endless cable having a multifilament core, an outer flexible polymeric sheath, and a plurality of hard protrusions fixed thereto by crimping over the sheath, said cutting cable configured to be mounted in a circuit on a frame for movement thereabout, said frame suspendable into a water body.

23. The cutting cable of claim 22, wherein said protrusions increase the overall effective diameter of said endless cable by about 1-4 mm.

* * * * *

UNITED STATES PATENT AND TRADEMARK OFFICE
CERTIFICATE OF CORRECTION

PATENT NO.   : 5,430,998
DATED        : July 11, 1995
INVENTOR(S)  : Allan J. Albrecht It is certified that error appears in the above-indentified patent and that said Letters Patent is hereby corrected as shown below:

Column 3, line 5, after the words, "the plant" delete "stein" and substitute -- stem-- therefor.
Column 4, line 34, after the phrase, "cable 28" delete "strong and substitute --strung--. therefor.
Column 5, line 9, after the phrase, "Fig. 2," delete "tipper" and substitute --upper-- therefor.

Signed and Sealed this

Eighth Day of April, 1997

Attest:

BRUCE LEHMAN

*Attesting Officer*          Commissioner of Patents and Trademarks